United States Patent
Cheng et al.

(10) Patent No.: US 10,606,254 B2
(45) Date of Patent: Mar. 31, 2020

(54) METHOD FOR IMPROVING PROCESS/EQUIPMENT FAULT DIAGNOSIS

(71) Applicant: EMERSON PROCESS MANAGEMENT POWER & WATER SOLUTIONS, INC., Pittsburgh, PA (US)

(72) Inventors: Xu Cheng, Pittsburgh, PA (US); Azime Can-Cimino, Pittsburgh, PA (US); Richard W. Kephart, Kittanning, PA (US)

(73) Assignee: EMERSON PROCESS MANAGEMENT POWER & WATER SOLUTIONS, INC., Pittsburgh, PA (US)

( * ) Notice: Subject to any disclaimer, the term of this patent is extended or adjusted under 35 U.S.C. 154(b) by 390 days.

(21) Appl. No.: 15/265,517

(22) Filed: Sep. 14, 2016

(65) Prior Publication Data
US 2018/0074482 A1 Mar. 15, 2018

(51) Int. Cl.
*G05B 23/02* (2006.01)

(52) U.S. Cl.
CPC ....... *G05B 23/027* (2013.01); *G05B 23/0237* (2013.01); *G05B 23/0243* (2013.01);
(Continued)

(58) Field of Classification Search
None
See application file for complete search history.

(56) References Cited

U.S. PATENT DOCUMENTS

| | | | | |
|---|---|---|---|---|
| 5,486,995 A | * | 1/1996 | Krist | G05B 13/00 700/29 |
| 6,622,101 B1 | * | 9/2003 | Oechsner | G07C 3/14 702/181 |

(Continued)

OTHER PUBLICATIONS

Lapira, "Fault Detection in a Network of Similar Machines Using Clustering Approach," University of Cincinnati Dissertation (2012).

(Continued)

*Primary Examiner* — Mohammad Ali
*Assistant Examiner* — Kelvin Booker
(74) *Attorney, Agent, or Firm* — Marshall, Gerstein & Borun LLP

(57) ABSTRACT

Systems and approaches for error detection detect discrepancies in industrial equipment by comparing a particular asset to similar industrial assets running in parallel to the particular asset. An error detection unit detects a difference between an estimated and actual output of the asset. Based on the magnitude of the difference, the error detection unit determines whether an input value of the particular asset is similar to input values of the plurality of industrial assets and whether an output value of the particular asset is similar to output values of the plurality of industrial assets. If the input value of the particular asset is similar to the input values of the plurality of industrial assets and the output value of the particular asset is not similar to the output values of the plurality of industrial assets, then the error detection system sets an alarm. However, if the input value of the particular asset is not similar to the input values of the plurality of industrial assets, the error detection system considers whether to adapt the process model for the particular asset to account for a new process state or condition not considered when creating the process model for the particular asset.

48 Claims, 4 Drawing Sheets

(52) U.S. Cl.
CPC .............. *G05B 2219/34457* (2013.01); *G05B 2219/42132* (2013.01)

(56) References Cited

U.S. PATENT DOCUMENTS

| | | | | |
|---|---|---|---|---|
| 7,124,101 | B1* | 10/2006 | Mikurak | G06Q 10/06 705/35 |
| 8,655,757 | B1* | 2/2014 | Wookey | G06Q 30/06 705/35 |
| 8,682,835 | B1* | 3/2014 | Bickford | G06F 11/0706 706/52 |
| 9,804,588 | B2* | 10/2017 | Blevins | G05B 19/4184 |
| 9,945,264 | B2* | 4/2018 | Wichmann | F01K 13/02 |
| 9,946,585 | B1* | 4/2018 | Wookey | G06F 11/00 |
| 10,176,032 | B2* | 1/2019 | Horrell | G06F 11/0751 |
| 10,282,676 | B2* | 5/2019 | Nixon | G05B 13/0265 |
| 2002/0077711 | A1* | 6/2002 | Nixon | C10G 11/187 700/51 |
| 2002/0123856 | A1* | 9/2002 | Eryurek | G05B 23/0243 702/140 |
| 2002/0128805 | A1* | 9/2002 | Goldman | G05B 13/048 703/2 |
| 2002/0147506 | A1* | 10/2002 | Eryurek | G05B 13/0275 700/28 |
| 2004/0186927 | A1* | 9/2004 | Eryurek | G05B 15/02 710/12 |
| 2005/0007249 | A1* | 1/2005 | Eryurek | G05B 23/027 340/511 |
| 2007/0005266 | A1* | 1/2007 | Blevins | G05B 17/02 702/22 |
| 2009/0149972 | A1 | 6/2009 | Nasle | |
| 2009/0198350 | A1* | 8/2009 | Thiele | G05B 13/042 700/30 |
| 2010/0082691 | A1* | 4/2010 | Jaster | G06Q 30/02 707/792 |
| 2013/0204808 | A1* | 8/2013 | Jiang | G06N 20/00 706/12 |
| 2013/0268501 | A1* | 10/2013 | Gorinevsky | G06Q 10/20 707/693 |
| 2014/0107993 | A1 | 4/2014 | Cheng | |
| 2014/0200952 | A1* | 7/2014 | Hampapur | B61K 9/08 705/7.28 |
| 2015/0058234 | A1* | 2/2015 | Dozier | G06T 11/206 705/315 |
| 2015/0120359 | A1* | 4/2015 | Dongieux | G06Q 10/0633 705/7.15 |
| 2015/0185716 | A1* | 7/2015 | Wichmann | F01K 23/101 700/287 |
| 2016/0274552 | A1* | 9/2016 | Strohmenger | G05B 11/01 |
| 2016/0281607 | A1* | 9/2016 | Asati | F02C 9/28 |
| 2016/0282844 | A1* | 9/2016 | Nomoto | G06Q 10/06 |
| 2016/0282847 | A1* | 9/2016 | Germann | G05B 19/4065 |
| 2016/0335731 | A1* | 11/2016 | Hall | G06Q 50/163 |
| 2016/0371476 | A1* | 12/2016 | Turgeman | G06F 21/316 |
| 2017/0052536 | A1* | 2/2017 | Warner | G06Q 10/06312 |
| 2017/0091450 | A1* | 3/2017 | Turgeman | G06F 21/32 |
| 2017/0323274 | A1* | 11/2017 | Johnson | G05B 13/041 |
| 2017/0351241 | A1* | 12/2017 | Bowers | G05B 19/406 |
| 2017/0364043 | A1* | 12/2017 | Ganti | G05B 13/048 |
| 2018/0004661 | A1* | 1/2018 | Umehara | G06F 12/0806 |
| 2018/0131765 | A1* | 5/2018 | Puleston | G06K 7/10366 |
| 2018/0314816 | A1* | 11/2018 | Turgeman | G06F 21/36 |
| 2019/0003929 | A1* | 1/2019 | Shapiro | G05B 19/18 |

OTHER PUBLICATIONS

Chiang et al., "Fault diagnosis in chemical processes using Fisher discriminant analysis, discriminant partial least squares, and principal component analysis", Chemometrics and Intelligent Laboratory Systems 50, 243-252 (2000).

Caudill et al., "Application of Advanced Pattern Recognition to Power Plant Condition Assessment", pp. 1-15 (1996).

Qin et al., "Nonlinear PLS Modeling Using Neural Networks", Computers chem. Engng, 16.4:379-391 (1992).

George et al., "Fault Detection of Drinking Water Treatment Process Using PCA and Hotelling's $T^2$ Chart", World Academy of Science Engineering and Technology, 3:786-791 (2009).

He et al., "A New Fault Diagnosis Method Using Fault Directions in Fisher Discriminant Analysis", AIchE Journal, 51.2:555-571 (2005).

Griebenow et al., "Applied Pattern Recognition for Plant Monitoring and Data Validation", Instrumentation, Control, and Automation in the Power Industry, 38:21-30 (1995).

Yoon et al., "Multivariate Process Monitoring and Early Fault Detection (MSPC) using PCA and PLS", National Petrochemical & Refiners Association, 1-18 (2003).

Hansen et al., "Similarity Based Regression: Applied Advanced Pattern Recognition for Power Plant Analysis", pp. 1-9, Jun. 1, 1995.

Search Report for Application No. GB1714102.9, dated Apr. 30, 2018.

* cited by examiner

METHOD FOR IMPROVING PROCESS/EQUIPMENT FAULT DIAGNOSIS

FIELD OF THE DISCLOSURE

The present application generally relates to the detection of equipment faults and, more particularly, to the implementation of parallel system fault detection.

BACKGROUND

A number of industrial and non-industrial applications use error detection and/or fault diagnosis systems to determine when equipment is damaged or otherwise exhibiting an error condition. Typical model types include multivariate linear or non-linear regression models, multi-regional linear regression models (or "piece-wise linear models"), principal component analysis (PCA) or partial least square (PLS) based models, discriminant analysis, and neural network based models, to name a few. Generally speaking, in these models, historical and/or live data generated under normal equipment operating conditions are collected in order to build the model characterizing the relationship between a process input and a process output.

These models generally require a substantial amount of time to perform designed experimental tests and collect data while the equipment is online, thus impacting operating efficiencies. Conversely, collecting and analyzing historical data in an off-line manner is also time consuming and can impact operating efficiencies. If the data collection is incomplete, or if an operational aspect of the actual process is modified while in operation, subsequent operation of the process model may be ineffective because the existing process model may be incapable of distinguishing between actual errors and false positives. For example, the process model may be unable to determine a difference between an equipment error and a normal scenario when a new, but normal, process scenario is encountered that was not reflected in previous historical data, or when information regarding this normal operating condition was missed in the original process model due to human error and/or time constraints.

Variations in component quality can also have an impact on asset outputs. As a non-limiting example, in a power plant environment utilizing pulverizers, coal quality (e.g., heating value, moisture content, etc.) can vary under different conditions. As a result, it may be difficult to initially collect and model data to cover every quality scenario. In this and other examples, output deviations do not necessarily mean that the unit is operating erroneously or is in danger of failure. Because the process model data is typically the only source of failure information, existing systems are limited in potential options for improvement.

SUMMARY

Methods and systems for improving process and/or equipment fault diagnoses are provided for use in applications where multiple processes and/or equipment of the same or similar type operate in parallel. Generally speaking, the methods and systems compare each of the actual outputs of a particular set of process equipment with its predicted output as generated by a process model to detect differences between the actual outputs and the predicted outputs, to thereby detect potential errors in the operation of the process equipment. However, the methods and systems also compare operational characteristics of the particular process equipment with the operational characteristics of the additional equipment operating in parallel with the particular process equipment to detect variations within the operation of sets of similar equipment to verify whether detected anomalies in the particular equipment are also present in the parallel equipment. As such, the systems and methods described herein provide for the cross-validation of equipment outputs to detect the presence of errors or anomalies as well as to distinguish actual errors from false alarms. The systems and methods described herein provide for process operation validation across a number of process characteristics to ensure the validity of a detected anomaly, and can additionally be used to update the process model in real time. By comparing detected issues or error conditions on one asset of the plant with other assets running in parallel, any "deviations" which may occur can be explored and compared to see if these deviations are present in all similar assets, and if so, the systems and methods can rule out the possibility of component failure, thus reducing the possibility of false alarms. Still further, the systems and methods can update the process model of the process equipment to reflect or account for process conditions that led to the false alarm in the first place, to thereby provide for a better process model during future error condition detection.

In one embodiment, a technique for detecting errors in an industrial asset operating synchronously with similar industrial assets includes obtaining a process model for each industrial asset and synchronously executing a process using the industrial asset and the process model for each industrial asset. For a particular asset, the technique compares an error value, calculated from a difference between an actual output of the process and a predicted output of the process model. Based on the comparison of the error value, the technique then determines whether an input value of the particular asset is similar to input values of the plurality of similar industrial assets and whether an output value of the particular asset is similar to output values of the plurality of similar industrial assets. If the input value of the particular asset is similar to the input values of the plurality of industrial assets and the output value of the particular asset is not similar to the output values of the plurality of industrial assets, the routine triggers an alarm indicating an error in the particular asset. If the input value of the particular asset is not similar to the input values of the plurality of industrial assets (e.g., an average input value of the plurality of industrial assets), the technique determines whether the input value of the particular asset (e.g., the process state defined by this input value) was accounted for or considered when developing the process model. If the input value of the particular asset was accounted for when developing the process model, the technique triggers the alarm indicating an error in the particular asset. If the input value of the particular asset is not accounted for in the process model, the technique adapts the process model to include operation of the process at the input value of the particular asset. Finally, if the input value of the particular asset is similar to the input values of the plurality of industrial assets (e.g., an average input value of the plurality of industrial assets) and the output value of the particular asset is similar to the output values of the plurality of industrial assets (e.g., an average output value of the plurality of industrial assets), the technique adapts the process model to include consideration of the process state defined or represented by the input value and/or the output value of the asset. This approach may be completed for each of the industrial assets operating in parallel to each other.

In some cases, the error value is compared to a threshold value that may be based on any number of characteristics of the particular industrial asset. The threshold values may also serve to tune the parameters of the asset. In many approaches, the input values of the plurality of industrial assets can be calculated as average normal input values and the output values of the plurality of industrial assets can be calculated as average normal output values. The calculated average normal input values and the calculated average normal output values can be calculated using input and output values for the plurality of industrial assets while excluding the particular asset that indicated an error. To determine whether the error value is similar to the average normal value, an input/output similarity test may be performed over a specified period of time. Moreover, either or both of the input values and the output values may be vectors, representing values of multiple inputs and/or multiple outputs.

In some cases, the system and technique triggers an alarm depending on whether the input value of the asset is recognized as being part of a training class or set. In these approaches, if the input value is recognized as being a part of the training class, the system triggers the alarm to indicate an alarm or error situation.

In other embodiments, a method for adapting a process model in real time includes obtaining a process model for each of the industrial assets and synchronously executing the process model and a corresponding process for each asset. For a particular asset, the method compares an error value based on a difference between an actual output of the process and a predicted output produced using the process model. Based on the comparison of the error value, the method determines whether an input value of the particular asset is similar to input values of the plurality of industrial assets and whether an output value of the particular asset is similar to output values of the plurality of industrial assets. If the input value of the particular asset is similar to the average input values of the plurality of industrial assets and the output value of the particular asset is similar to the output values of the plurality of industrial assets, the method adapts or updates the process model to indicate the error value should not trigger the alarm. In one example, the process model can be adapted by appending the input value and the output value of the particular asset to the training data used to create the process model and running a process model generation procedure to regenerate the process model.

In these examples, the threshold value is predefined and is based on any number of characteristics of the particular industrial asset. The average normal value can be calculated, for example, using average input and output values for the assets while excluding the particular asset that indicated an error value exceeds the threshold value. To determine whether the input/output value is similar to the average normal value, an input/output similarity test may be performed over a specified period of time.

In these approaches, if the input/output value is not similar to the average normal value, the method determines whether an actual input of the process is similar to an average input of each of the plurality of industrial assets. If the actual input of the process is similar to the average input for each of the plurality of industrial assets, the alarm is then activated. Conversely, if the actual input of the process is not similar to the average input for each of the plurality of industrial assets, the method determines whether the actual input of the process is a part of an existing training set.

In some forms, an error detection system includes a plurality of industrial assets each having at least one input and one output, and a control unit communicatively connected to the plurality of industrial assets to control operation thereof such that the plurality of industrial assets operate in parallel to each other. The control unit also operates to detect a discrepancy in the operation of a particular industrial asset. Upon detecting the discrepancy in the operation of a particular asset, the control unit determines whether an input value of the particular industrial asset is similar to input values of the plurality of industrial assets and whether an output value of the particular industrial asset is similar to output values of the plurality of industrial assets. These input and output values may be vectors including values for multiple different inputs and output, if desired. If the input value of the particular asset is similar to the input values of the plurality of industrial assets and the output value of the particular asset is not similar to the output values of the plurality of industrial assets, the control unit is adapted to generate an alarm indicating an error in the particular asset. In the event the input value of the particular industrial asset is similar to the input values of the plurality of industrial assets (such as an average input value of the plurality of industrial assets) and the output value of the particular industrial asset is similar to the output values of the plurality of industrial assets (such as an average output value of the plurality of industrial assets), the control unit adapts the process model to include the process state or process operating condition represented by the input value and/or the output value.

If the input value of the particular industrial asset is not similar to the input values of the plurality of industrial assets (e.g., an average input value of the plurality of industrial assets), the control unit operates to determine whether the input value of the particular industrial asset (or the process state represented by that input value) is accounted for or was considered when developing or creating the process model. If the input value or process state of the particular industrial asset was accounted for in the development of the process model, the control unit then generates the alarm indicating an error in the operation of the particular industrial asset. Conversely, if the input value or process state of the particular industrial asset was not accounted for in the development of the process model, the control unit operates to adapt the process model to account for or to consider the input value of the particular industrial asset as a new possible process state in which the output of the particular asset represents desired operation of the asset during that new process state.

In examples, the control unit can include a process model generator, a controller, and an error detection unit. The process model generator operates to generate a process model which can be used to produce a predicted output for each of the assets. For each asset, the controller operates to generate a control signal for executing a process which controls each of the assets. This control signal is produced synchronously with the operation of the process model for each of the assets. The error detection unit is adapted to calculate 1) an error value based on a difference between an actual output of a particular process asset and the predicted output of the process model for the particular process asset; and 2) a representation of a combined (e.g., average) input value and a combined (e.g., average) output value from the input values for the plurality of industrial assets and the output values of the plurality of industrial assets. The error detection unit detects the discrepancy in the particular industrial asset by comparing the error value to a threshold value based on a plurality of characteristics of the industrial asset, and also compares the input value of the particular industrial asset to the combined input values of the plurality of industrial assets and compares the output value of the particular industrial asset to the combined output values of the plurality of industrial assets. In some examples, the error detection unit can calculate the combined input value for the plurality of industrial assets and the combined output value for the plurality of industrial assets by calculating an average normal input value and an average normal output value for the plurality of industrial assets. This calculation may be a vector or a scalar calculation.

In many examples, the operational characteristics may include asset inputs, asset outputs, or other asset operating parameters or characteristics. For example, the operational characteristics of an asset may include flow rates, temperatures, pressures (e.g., inlet and output pressures, intermediate pressures, etc.), fluid levels, and the like. Other examples of operational characteristics are possible.

So configured, the systems and methods described herein can improve effectiveness and reliability of existing diagnostic procedures and can minimize the chances of signaling false alarms, thus reducing system downtime and operator involvement. By performing such real-time comparisons, the systems and methods can also collect data and update the process model for on-line model adaptation. At periodic time intervals, the adapted model uses real-time input data to calculate a predicted output. If the difference between the actual output and the predicted output is smaller than a predetermined threshold, the equipment is regarded as normal. However, if the difference is larger than the threshold, the equipment is regarded as potentially abnormal and will be subject to further investigation. The on-line adaptation of the process model, however, makes the detection of errors more accurate as the asset operates on-line or in an actual plant or other industrial setting environment.

DETAILED DESCRIPTION

Generally speaking, the systems and approaches described herein include a multi-step process of fault or error diagnosis and detection during the operation of process equipment. During normal operation of an asset, such as a piece of process equipment, a process model operating for that asset operates to detect potential errors. Upon detecting the potential error, the error detection system then performs subsequent inquiries using data obtained from other assets that are operating in parallel with the particular asset to determine whether the asset is in fact operating in error, or alternatively, whether the process model must be adapted to account for new or different process operating conditions. It is understood that the terms "industrial asset," "asset," "unit," and/or "equipment" are used interchangeably herein and refer to a machine, component, and/or device being used in a desired environment.

Generally speaking, the subsequent inquiries made by the system after an initial or preliminary error detection include a similarity test to determine whether the asset is operating in a comparable manner to one or more other parallel assets which are presumed to be in proper operating condition. If the asset passes the similarity test, the process model (in its current state) may lack sufficient operational information (e.g., inputs and/or outputs) to recognize that the asset was not operating in error. In other words, the process inputs and/or outputs that resulted in the indication of an error were not in a range originally considered when making or developing the process model and thus may not be modeled accurately. To remedy the lack of operational information, the error detection system updates the process model based on this new process operating information. If the asset fails the similarity test, the asset is determined to be operating in an error condition, which in turn warrants an alarm.

Figure 1:
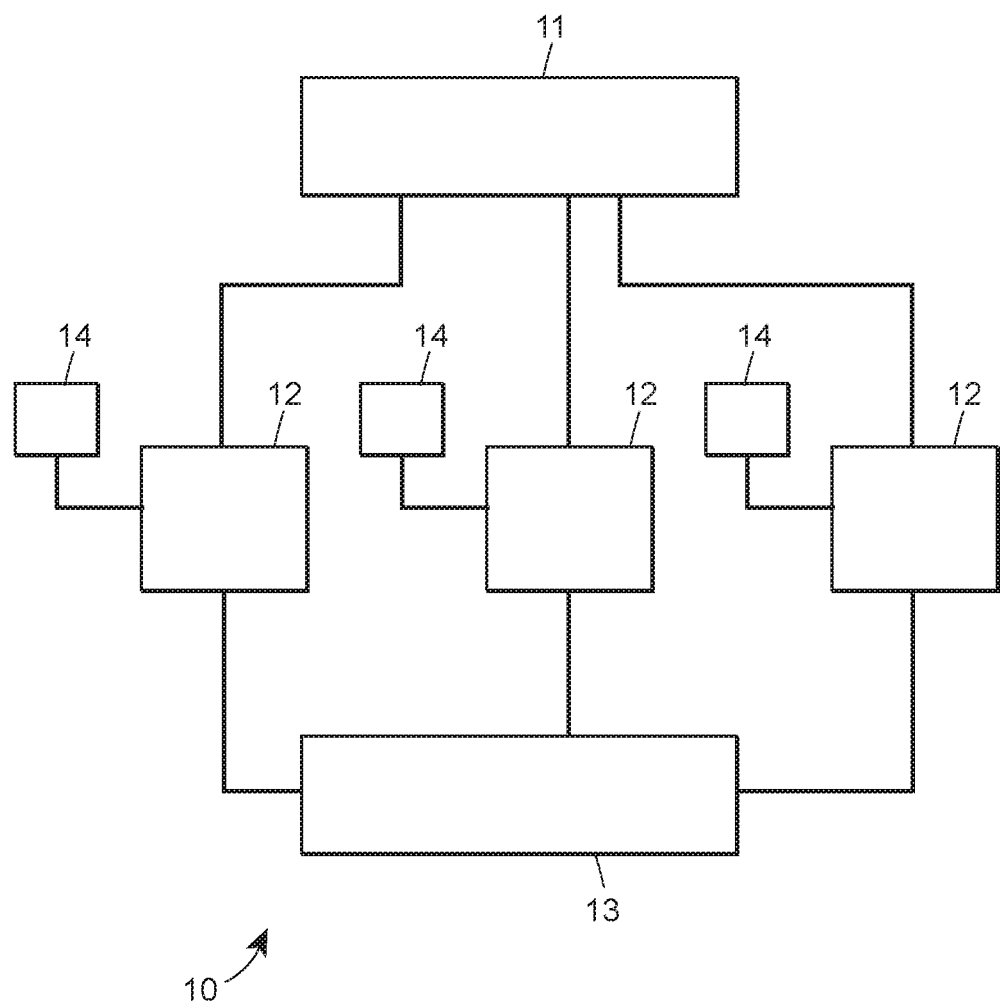
FIG. 1 illustrates a block diagram of a generalized environment having a set of similar industrial assets operating in parallel.

FIG. 1 illustrates a block diagram of a generalized process or industrial environment 10 having a number of industrial assets 12. The assets 12 can be any type of equipment such as, for example, a primary air fan that supplies air to additional components. In this environment 10, each of the assets 12 is coupled to a controller 14 that controls and monitors operation of the asset 12. It is understood that, in some examples, a single controller 14 can be coupled to all or any number of the assets 12. While FIG. 1 illustrates a single input asset 11 providing inputs to all of the assets 12 and a single output asset 13 receiving outputs from all of the assets, it is understood that the environment 10 can include any number of input and output assets 11, 13.

While each of the illustrated assets 12 operates in parallel in the environment 10, in prior systems, the assets 12 and their corresponding controllers 14 operated on a one-to-one, single-unit basis, meaning any form of error detection process related to a single particular asset and the process controllers 14 did not share typical operational information between assets. Conversely, in the error detection system described herein, the system shares operational information between assets to determine and/or confirm whether the assets (such as the assets 12) are operating properly.

Figure 2:
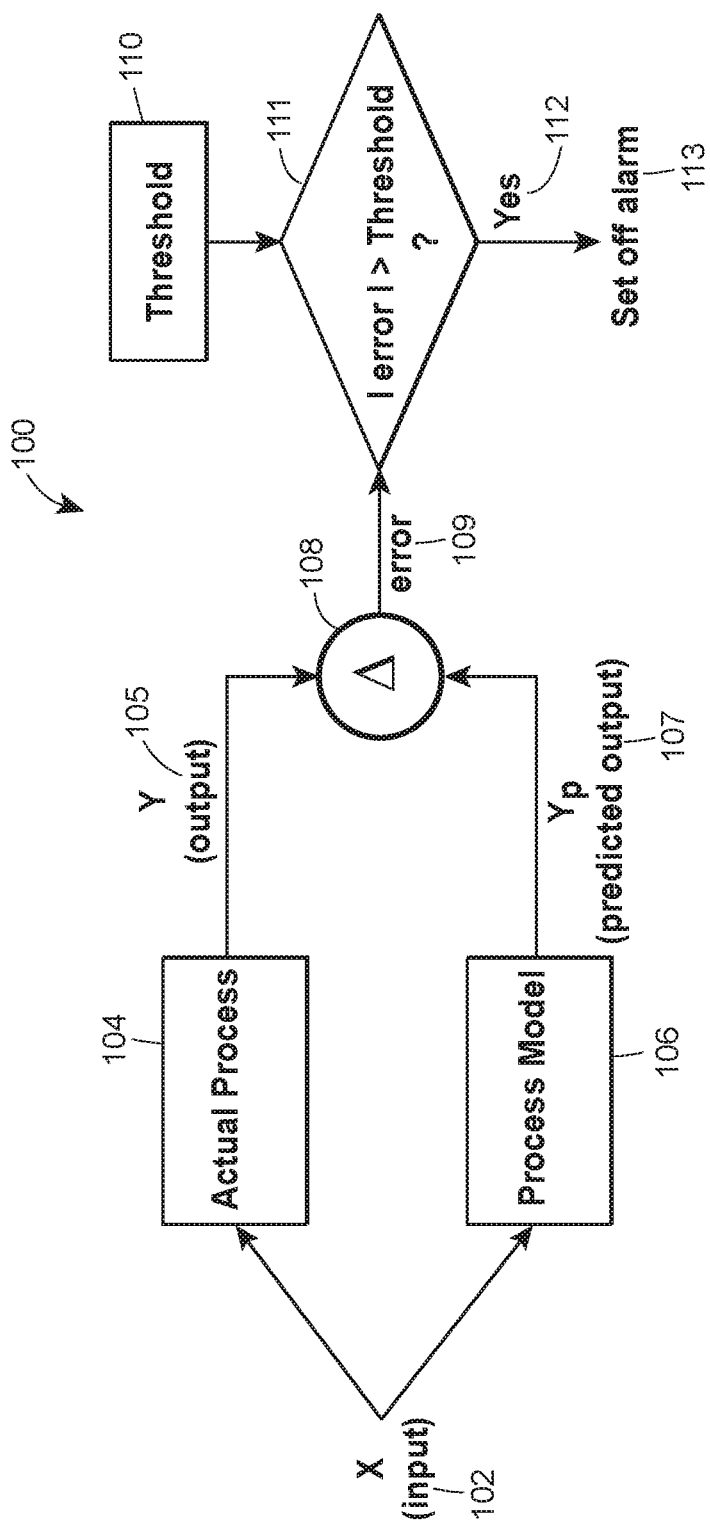
FIG. 2 illustrates a typical flow chart for detecting faults in an industrial system.

FIG. 2 illustrates a block diagram of a typical prior art single-unit fault error detection system 100 that may be used, for example, to detect erroneous operation of industrial assets operating in an industrial environment. The system 100 may include an input 102 (e.g., real time data represented by variable "x") fed to an actual process 104 and to a process model 106 which models the process 104. In this context, the process 104 may include one or more pieces of equipment that operate together on the input x (e.g., raw material) to produce some product or component of a product. Thus, for example, the actual process 104 may be a process for controlling an industrial asset and/or equipment. Moreover, the process model 106 may be any type of process model that models the operation of the process 104 and/or that models the operation of the equipment within the process 104. As examples only, the process model may be a first principles model, a neural network model, a regression model, etc.

In any event, the process 104 produces an output 105 (represented by a variable "Y"), and the process model 106 generates a predicted output 107 (represented by a variable "$Y_p$"). A comparator 108 calculates the difference between the output 105 and the predicted output 107 and generates an error value 109. The error detection system 100 then determines whether the error value 109 is greater than a predetermined threshold value 110 at a step 111. This predetermined threshold can be determined in a variety of ways, such as, for example, by an operator. Other examples are possible. If the error value 109 is larger than the threshold value 110, an alarm may be triggered at a step 113. However, the process model 106 may be unable to determine a difference between an equipment error and a normal operational status when a new, but normal, process scenario is encountered that was not reflected in previous historical data, and accordingly, the process 104 may erroneously trigger the alarm.

Figure 3:
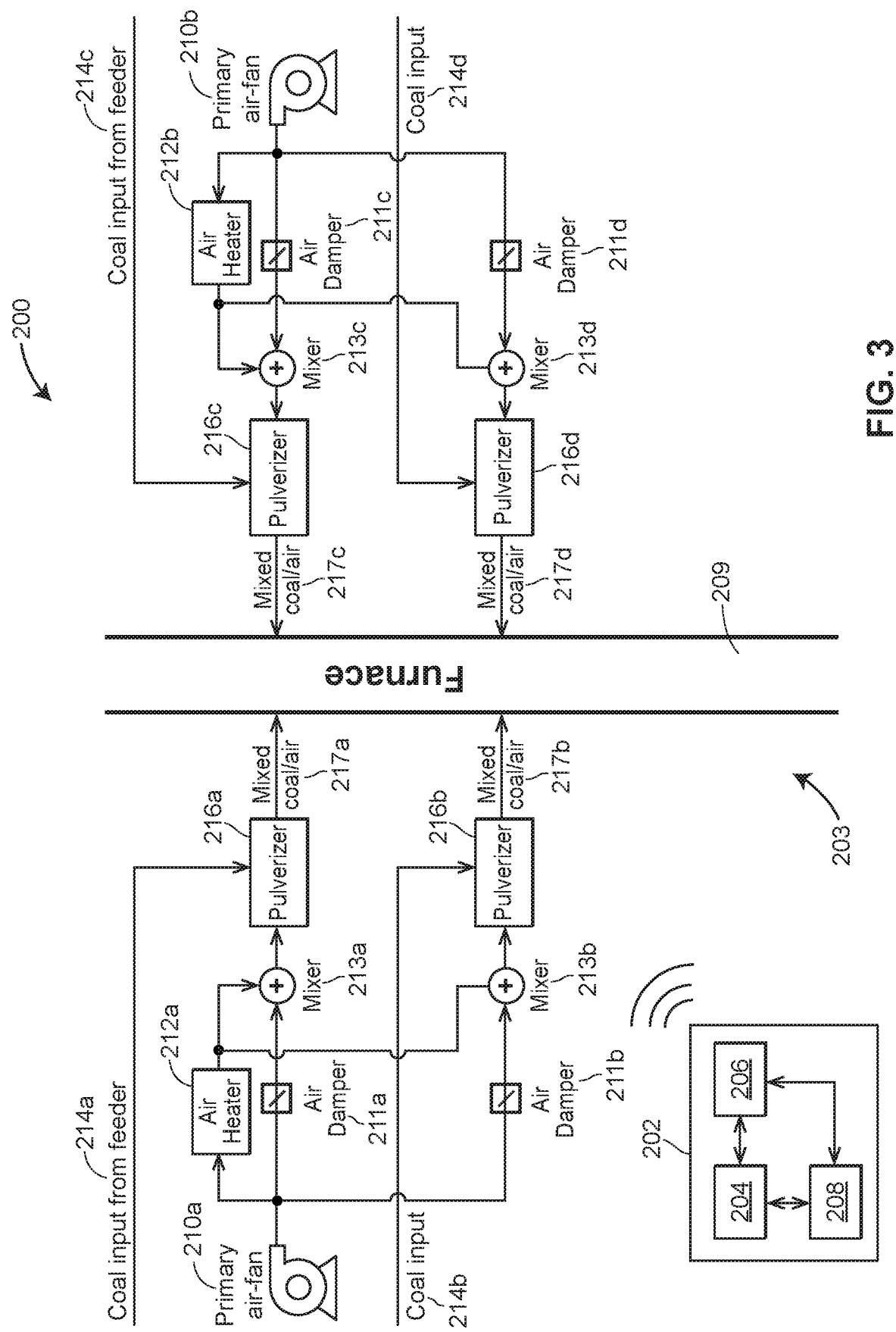
FIG. 3 illustrates a block diagram of a detailed environment having a plurality of industrial assets operating in parallel and having a fault detection system coupled thereto.

Turning to FIG. 3, an exemplary industrial system 200 in the form of a portion of a coal-fired power plant, as an example, includes a control unit 202 and a furnace unit 203. The control unit 202 can include any combination of hardware and software elements selectively chosen to execute a particular task, and may include, for example a process model generator 204, a controller 206, and an error detection unit 208. It is understood that the control unit 202 can include any number of fewer or additional components than illustrated. The system 200 further includes a furnace 209 that is fed by a number of industrial assets connected in parallel with one another, each of the sets of parallel connected equipment generally including the same or similar types of equipment therein for performing a particular task. In this case, the sets of parallel equipment includes four sets of pulverizer equipment providing mixed coal and air to the furnace 209. More particularly, there are two sets of equipment each including a primary air-fan 210a or 210b and an air heater 212a or 212b that provide air and heated air to two parallel connected sub-sets of equipment, each subset set of equipment including an air damper 211a-211d, a mixer 213a-213d and a pulverizer 216a-216d. Thus, the system 200 includes various parallel connected industrial assets such as primary air fans 210a, 210b, air heaters 212a, 212b, air dampers 211a-211d, and mixers 213a-213d, coal feeders (not shown) providing coal inputs 214a, 214b, 214c, 214d, and pulverizers 216a, 216b, 216c, 216d which operate in parallel to each other to produce the mixed coal/air streams 217a-217d. In other words, the two air fans 210a, 210b operate in parallel (that is, synchronously), the two air heaters 212a, 212b operate in parallel, the four mixers 213a-213d operate in parallel, the four air dampers 211a-211d operate in parallel, and the four pulverizers 216a, 216b, 216c, 216d operate in parallel. Likewise, combinations of various ones of these equipment also operate in parallel. It is understood that the system 200 can include any number of additional industrial assets capable of operating in parallel to each other, and that the system 200 may further include any number of additional components and/or assets. For example, the system 200 may include any number of air dampers 211a, 211b, 211c, 211d, air mixers 213a, 213b, 213c, 213d, and any other components required for operation of the power plant. Each of these components may be communicatively connected to any number of sensors which measure operational information or characteristics of the process. For example, the system 200 may include feed or flow rate sensors, temperature sensors, pressure sensors, and the like. Other examples are possible.

The control unit 202 is communicatively connected to some or all of the various industrial assets 209-216 to control operation of the industrial assets 209-216 in a manner that allows the assets 209-216 to operate in parallel to process coal (e.g., burn coal) in the furnace unit 203. In the exemplary system depicted in FIG. 3, the primary air fans 210a, 210b output air to the air heaters 212a, 212b and the air dampers 211a, 211b, 211c, 211d. Upon exiting the air heaters 212a, 212b and air dampers 211a, 211b, 211c, 211d, the heated and non-heated air then enters the mixers 213a, 213b, 213c, 213d, which mix the air to generate air at a controlled temperature, which air is then output at a desired temperature. The air is then sent to the pulverizers 216a, 216b, 216c, 216d. Coal inputs 214a, 214b, 214c, 214d from the feeders is also sent to the pulverizers 216a, 216b, 216c, 216d, respectively, whereupon the air and coal is mixed to produce a controlled coal/air mixture or feed stream (217a, 217b, 217c, 217d), which is sent to and burned in the furnace 209.

As will be understood, the system 200 includes varying numbers of assets operating in parallel. For example, the system 200 includes two primary air fans operating in parallel (210a, 210b), two air heaters operating in parallel (212a, 212b), four coal inputs from feeders operating in parallel (214a, 214b, 214c, 214d), and four pulverizers (216a, 216b, 216c, 216d) operating in parallel. For the purposes of clarity, the number of identical or near-identical assets is hereby denoted "n." This number does not include processes or equipment that are out of service or known to exhibit problems. As noted above, the controller 206 of the control unit 202 communicates with the various assets within the furnace unit 203 to control the various controlled process variables, such as air temperature from the air heaters 212 and/or mixers 213, the positioning of the air dampers 211, the speed of the fans 210, etc. The error detection unit 208 of the control unit 202 can also be configured to perform the steps of the process or routine 300 as will be described herein. While the control unit 202 is illustrated as communicating wirelessly with the furnace unit, the control unit 202 can communicate with the assets or with sensors on the assets of the furnace unit 203 via wired communications using any standard or known communications protocol, or with mixed wireless and wired communications. Moreover, the process model generator 204 of the control unit 202 operates to generate and/or store process models that model various aspects of or equipment within the furnace unit 203. The process model generator 204 may for example, generate a process model for piece of equipment or any combination of equipment within each of the sets of parallel operated equipment described above. Such process models may be, for example, the process models used as the process models 106 in the error detection systems of FIGS. 2 and 4. Still further, the error detection unit 208 may operate to detect errors with individual equipment (assets) or with groups of equipment within the parallel operated equipment, such as that of FIG. 3.

Figure 4:
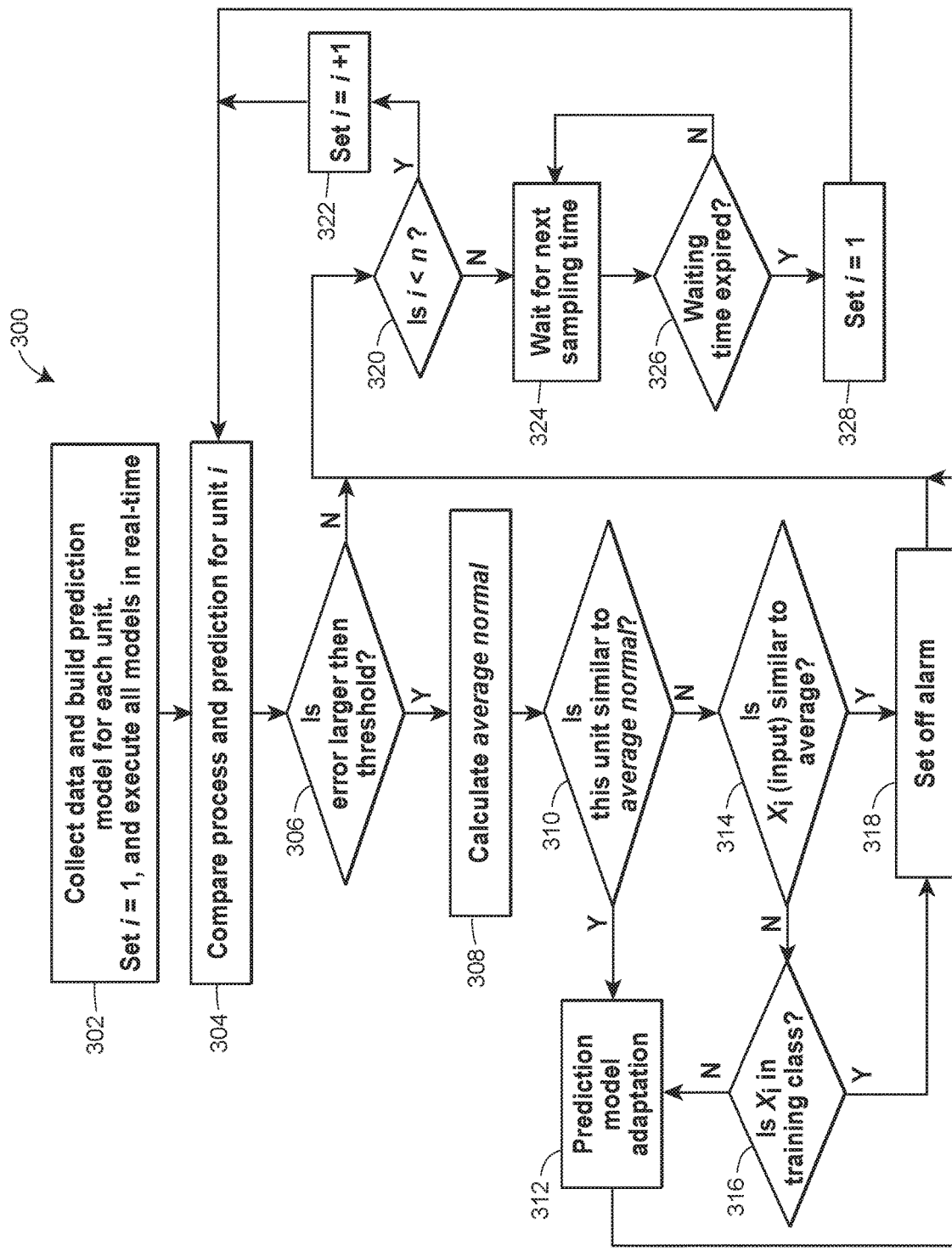
FIG. 4 illustrates a flow chart for detecting faults in a plurality of industrial assets operating in parallel.

FIG. 4 illustrates a process 300 for detecting faults in a plurality of industrial assets operating in parallel that may be used in or implemented by the error detection unit 208 of FIG. 3. Generally speaking, as the plant or process operates, the error detection unit 208 also operates using, for example, the process or routine 300 of FIG. 4, which models the plant operation using one or more prediction process models to determine the expected plant or asset operation. The routine 300 then compares the expected operation of the plant or asset with the actual measured operation of the plant or asset to determine if there is a significant difference between the two, meaning that there may be an error in the operation of the plant or asset. Such an error may be, for example, a hardware error resulting from an improperly functioning asset, may be a control error resulting from a control issue, a communication error resulting from poor, lost, or improper communications in the control system, etc. When a potential error is detected in an asset or group of assets, the error detection unit 208 then compares the operation of the potentially faulty asset or group of assets to the operation of one or more of the other assets running in parallel with the potentially faulty asset to determine if the potentially faulty asset is operating similarly to the other parallel operated assets. If non-similar operation is detected, e.g., when the inputs to the parallel assets are similar to the inputs to the potentially faulty asset but the outputs of the parallel assets are non-similar to the outputs of the potentially faulty asset, then the error detection unit 208 may detect an error and set an alarm or an alert to notify a user, operator, maintenance person, or the like.

However, if a similar operation is detected (e.g., in which the inputs to and/or the outputs from the other parallel operated assets are similar to the inputs to and/or outputs from the potentially faulty asset), then it is unlikely that an error has occurred, and the error detection unit 208 may not set or send an alarm to a user or operator. Moreover, if the inputs to the potentially faulty asset are not similar to the inputs of the other parallel operated assets, then the error detection unit 208 may determine if the inputs to the potentially faulty asset (or the process conditions that lead to those inputs) were within a range or process state that was included as part of the training data or process conditions that were used to generate the process model. If the equipment or process is operating in a range or process operating state that was not considered or used to create the process model used to make the process prediction, then the error detection unit 208 does not set an alarm, but instead may provide the inputs and outputs of the process equipment to the process model generator 204 to enable the process model generator 204 to regenerate the process model with the new process operating state data to thereby create a better or more accurate process model. If, on the other hand, the equipment or process is operating in a range or process operating state that was considered or used to create the process model used to make the process prediction, then the error detection unit 208 may still detect erroneous operation of the equipment and set an alarm or an alert.

More particularly for each asset or set of parallel operated assets, the process 300 may be implemented or run to detect errors during each of a number of cycles. Such cycles may be tied to or correspond to controller execution cycles (such as once per controller execution cycle, once every five controller execution cycles, etc.) or may be tied to or correspond with separate maintenance or error detection timing cycles which are not tied with controller execution cycles.

Generally speaking, the error detection system and method of FIG. 4 first creates or builds a process model for each asset or group of assets in each set of parallel operated assets. The error detection method and system then uses the process model to detect potential errors in the operation of assets, such as when the output or outputs of the asset or set of assets is significantly different than the predicted output or outputs of the asset or set of assets as determined by the process model for the asset or set of assets. If a potential error is detected in a particular asset, the process 300 then calculates average operational data relating to the particular asset. This average operational data may include input and/or output data. Next, the process 300 uses the average operational data of the particular asset that indicated an error to conduct a number of comparisons to corresponding average operational data obtained from the remaining parallel operated assets. The process 300 uses the results of these comparisons to determine 1) whether the particular asset is in fact exhibiting an error which necessitates an alarm; and 2) whether the process should adapt the prediction model to include new data, thereby reducing the occurrence of false positives.

More particularly, at a step 302, for each asset or unit (for example, for each of the pulverizers 216 of FIG. 3 or for each of the sets of pulverizers 216, mixers 213, air heaters 212, and air fans 210 of FIG. 3) denoted as "i" in FIG. 4, the routine 300 collects data (e.g., from an existing data historian, from the plant operations, etc.) and builds a prediction model for that asset or set of assets. For each asset or set of assets, the process 300 runs or executes the corresponding actual process and the prediction model.

For the purposes of modeling, the step 302 may define a set of input and output variables for each asset or set of assets. For example, input variables may be flow rates of objects (e.g., coal or air) entering an asset, power consumption, and the like, and outputs may be exit flow rates, temperatures, pressures, and the like. Other examples are possible. The input variable set may be mathematically represented as a vector "X," and the output variable set may be mathematically represented as a vector "Y." In some examples, the prediction models being built are in a steady-state framework, and thus the input and output variables can be optionally obtained as instant measurements, delayed measurements, average measurements over a specified period of time, or a moving average over a specified period of time, as examples only. These variables can be used in their original engineering units or in a suitable format derived from scaling or normalization. In any event, the block 302 may collect the input and output vector data for a particular asset or group of assets over a particular period of time or over a set of process operating conditions (process states) and then generate a process model from the data. Such a process model could be a neural network model, a regressive model, such as a PLS model, etc. Of course, the block 302 could generate or obtain a model for each of the assets or sets of assets in any other manner, including receiving such a model from a user, a process engineer, etc.

At a step 304, the error detection system 208 compares the process and the prediction unit outputs for a particular asset i in real time. For example, as indicated in FIG. 4, the predicted process output $Y_{pi}$ is compared to the actual process output $Y_i$, and at a step 306, the process 300 determines whether the difference between the outputs, or the error, exceeds a predetermined threshold value. If the difference between these values is small and does not exceed the threshold value, no error or fault is detected, and the process 300 proceeds to observe the next asset via a step 320, where the process 300 determines whether there are other remaining assets to analyze for potential errors. If there are remaining assets, at a step 322, the process 300 sets the particular asset i to the next value, and the process 300 proceeds to the step 304. If there are no remaining assets to consider during this execution cycle of the error detection system 208, the process 300, at a step 324, waits for the next sampling time or execution time, and at a step 326, the process 300 determines whether the waiting time has expired. If the waiting time has not expired, the process 300 returns to the step 324. Conversely, if the waiting time has expired, the process 300 resets the particular asset number to the first value (e.g., 1) at a step 328, and the process 300 returns to the step 304. The sampling time may be a variable and can depend on the particular environment. For example, the sampling times for pulverizers may be between approximately five seconds and approximately five minutes. Other examples are possible.

If, at the step 306, the error is larger than the threshold, a potential error is detected with the operation of the process equipment or asset. Next, the routine 300 proceeds to perform a similarity test to determine if the asset (or set of assets) for which the potential error has been detected is operating in a manner that is similar to the other parallel operated equipment. As part of the similarity test, a step 308 calculates the average normal input values (or vector) $\overline{X}$ and the average normal output values (or vector) $\overline{Y}$ relative to the current particular asset i using the following equations for the input vector $\overline{X}$ and the output vector $\overline{Y}$:

$$\overline{X} = \frac{1}{n-1}\sum_{j=1}^{n} X_j \quad (i \leq n, \text{ and } j \neq i)$$

$$\overline{Y} = \frac{1}{n-1}\sum_{j=1}^{n} Y_j \quad (i \leq n, \text{ and } j \neq i)$$

where n represents the total number of assets in consideration (excluding those assets that are out of service and/or have known operational problems). These average normal values also exclude the current asset (i.e., the asset for which the potential error is detected) from the calculation.

A step 310 then determines whether the operation of the particular or current asset is similar to the average normal values of the remaining assets. In one case, t or a particular asset i, over a given timeframe H, the input and the output of the particular asset is similar to the average normal input if the following equations are true, respectively:

$$\|X_i - \overline{X}\| < \varepsilon_x$$

$$\|Y_i - \overline{Y}\| < \varepsilon_y$$

where $X_i$ is the actual or measured input vector of the current asset, where $Y_1$ is the actual or measured output vector of the current asset, and where $\varepsilon_x$ and $\varepsilon_y$ are threshold parameters, variables, and/or values, and may also serve the purpose of tuning variables. These threshold parameters may be predefined and may be based on any number of characteristics of the asset. In many examples, the operational characteristics or data include at least one input value, at least one output value, and/or other intermediate operational parameters of the asset. For example, operational parameters of an asset can include flow rates, temperatures, pressures, fluid levels, and the like. Other examples of operational characteristics are possible.

Thus, if the normalized difference between the input vector of the particular asset and the average normal input value of the remaining assets is less than the threshold $\varepsilon_x$, the input of the particular asset is considered similar to the average input. Moreover, if the normalized difference between the output vector of the particular asset and the average normal output vector value of the remaining assets is less than the threshold $\varepsilon_y$, the output of the particular asset is considered similar to the average output. If both the input and the output of the particular asset are similar to the average input and output of the remaining assets, respectively, the particular asset is deemed similar to the average normal.

The format selection of this vector norm follows typical mathematical conventions and can be flexible (e.g., 1-norm, 2-norm, and/or infinite norm formats can be used). In some examples, the similarity test criterion can be chosen by a smoothed average over the specified timeframe H. Specifically, the smoothed average can be an arithmetic mean, a weighted average, a root-mean-squared average, or any type of moving average scheme for previous samples within the timeframe.

In order to utilize the average normal values, an assumption must be made that a majority of the remaining assets are operating in normal conditions, and that the average state of the remaining assets can thus be used as a baseline for comparative purposes. The process 300 assumes that among a given number of assets, there are a maximum number of assets that may experience failure simultaneously, and this maximum number of assets constitutes less than half of the total units. The greater the number of assets exhibiting errors, the less accurate the average normal value will be. As a result, an "Assumed Failure Probability (AFP)," or a quantification of the validity of the average normal may be used. In one example, the AFP is equal to $(n_{mf}-1)/(n-1)$, where n represents the total number of units or assets, and $n_{mf}$ represents the assumed maximum number of units or assets that can exhibit errors simultaneously. This assumed number may be obtained from past experience and historical data, if desired, may be set by a user, or may be obtained in any other desired manner. In the event that historical data is not sufficient, the AFP can be selected as a tuning parameter for the purposes of initialization. As a result, the following equation may be used:

$$n_{mf} = int(1 + AFP*(n-1))$$

As an example, a starting point of the AFP can be selected as 25%. If there are two assets (e.g., if n=2), $n_{mf}$=1; if n=3, $n_{mf}$=1; if n=4, $n_{mf}$=1; if n=5, $n_{mf}$=2; and so on. The smaller that the AFP value is, the more reliable the average normal value will be, and thus the less likely that the process 300 will trigger or set off false alarms.

Returning to FIG. 4, if the step 310 of the process 300 determines that the particular asset is similar to average normal (e.g., the asset passes the similarity test whereby the differences between the input vector and the output vector of the asset and the average normal for the input vector and the average normal for the output vector, respectively, are less than the respective threshold values), the operation of the asset is similar to the average normal operation at this step, and all of the remaining assets, on average, are generating similar inputs and outputs. In this scenario, the routine 300 detects no fault in the operation of the asset or set of assets being analyzed and, instead, control is provided to a step 312 that collects the input and output data from the asset being analyzed and uses this data to adapt the prediction model for the asset. Upon adapting the prediction model, if, at a later time, the asset generates similar outputs as those sensed based on similar inputs, the routine 300 will not deem these values to be faults or errors, and thus the routine 300 will not proceed to trigger an alarm or produce a false alarm. After the prediction model is adapted, the process 300 proceeds to the step 320 where the next asset is observed.

If the block 310 of the routine 300 determines that the asset is not similar to the average normal, either because the input value or the output value, or both of these values of the particular asset are not similar to the respective average normal values (i.e., they differ by a preset threshold valve), then the asset may still be operating under an error condition. In this case, a step 314 determines whether the input of the particular asset is similar to the average normal input in the manner previously described. If the input of the particular asset is similar to the average normal input, the output of the particular asset must not be similar to the average normal output value and the particular asset is therefore operating differently, based on similar inputs, than the other parallel operated equipment. In other words, the asset being analyzed is receiving an input that is similar to the inputs of the parallel operated equipment (on average), but is still producing a non-similar output than the outputs of the parallel operated equipment (on average). As a result, a fault or error is causing the output to be incorrectly produced and so a step 318 then triggers an alarm. Control is then provided to the step 320 to analyze the other assets during the current error detection cycle.

If, on the other hand, at the block 314, the input of the particular asset (or current asset being analyzed) is not similar to the average normal input, there is a possibility that the non-similar operation of the asset being analyzed is due to an incomplete model of the assets which may happen, for example, if the real-time input of the asset is not represented in the existing training data set that was used to create the prediction model for the asset. Thus, if the block or step 314 determines that the input of the current asset is not similar to the average normal input of the parallel operated assets, a step 316 performs a classification test on the current input data to determine whether the input of the particular asset is a part of the training class data used to train or create the prediction model for the current asset. In other words, the process 300 determines whether the input value(s) or the state of the process that is represented by the input values (or the combination of input values) was considered when creating the process model used as the prediction model for the current asset. The classification test is conventional and can be a vector distance calculation among input data, for example. In other examples, the classification test can include an unsupervised learning technique such as principal component analysis (PCA), competitive neural networks, self-organizing neural networks, k-mean classifications, and the like.

If the input value is a part of the training class, then the model is presumably operating correctly because it has been trained to consider the process state defined by the current set of process inputs, and thus the routine 300 proceeds to the step 318 which triggers the alarm or alert. The process 300 triggers the alarm at this stage because a fault is likely to have occurred within the asset if the process model used to analyze the operation of the asset was created considering or modeling the particular input value(s) and still results in an error detection.

Conversely, if the input(s) is/are not a part of the training class used to create the prediction model for the current asset, the block 302 did not have all of the requisite data to properly create the prediction model for the process operational state now being experienced, meaning that the prediction model was not properly configured for the current process state. Thus, in this case, the routine 300 incorporates the new input/output data into the model by adapting the prediction model at the step 312. Importantly, because the routine 300 and the block 312 in particular is able to adapt the prediction model, on the fly or in real time, the routine 300 does not need to be initially configured to include all possible process operational data points when creating a prediction model, which in turn saves time at the process initialization stage 302.

So configured, the routine 300 serves dual purposes of detecting errors in parallel assets in the system 200 in addition to adapting the process prediction models used to analyze process assets on the fly. Further, the routine 300 reduces the likelihood of false positives that generate alarms in the system 200. Moreover, the routine 300 reduces the overall time and complexity needed to build the process prediction models for the various process assets.

Skilled artisans will appreciate that the routine 300 can be implemented in any type of software or firmware implemented on any type of computer processor. When implemented in software, any of the applications, routines, blocks, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, such as computer processors, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for detecting an error in an industrial asset operating synchronously with similar industrial assets, the method comprising:
    obtaining a process model for each of a plurality of industrial assets;
    synchronously executing a process using the plurality of industrial assets and the process model for each of the plurality of industrial assets;
    for a particular asset, determining an error value from a difference between an actual output of the particular asset and a predicted output of the particular asset produced using the process model for the particular asset;
    based on the error value, determining whether an input value of the particular asset is similar to input values of the plurality of industrial assets and whether an output value of the particular asset is similar to output values of the plurality of industrial assets;
    wherein if the input value of the particular asset is similar to the input values of the plurality of industrial assets and the output value of the particular asset is not similar to the output values of the plurality of industrial assets, triggering an alarm indicating an error in the particular asset.

2. The method of claim 1, wherein if the input value of the particular asset is not similar to the input values of the plurality of industrial assets, determining whether the input value of the particular asset was accounted for in development of the process model for the particular asset.

3. The method of claim 2, wherein if the input value of the particular asset was accounted for in the development of the process model for the particular asset, triggering the alarm indicating an error in the particular asset.

4. The method of claim 2, wherein if the input value of the particular asset was not accounted for in the development of the process model for the particular asset, adapting the process model based on the input value of the particular asset.

5. The method of claim 1, wherein if the input value of the particular asset is similar to the input values of the plurality of industrial assets and the output value of the particular asset is similar to the output values of the plurality of industrial assets, adapting the process model for the particular asset based on the input value of the particular asset and the output value for the particular asset.

6. The method of claim 1, wherein determining the error value includes comparing the error value to a threshold value.

7. The method of claim 1, wherein the input values of the plurality of industrial assets comprise calculated average normal input values and the output values of the plurality of industrial assets comprise calculated average normal output values.

8. The method of claim 1, wherein determining whether the input value of the particular asset is similar to the input values of the plurality of industrial assets includes determining an average normal input value from the input values of the plurality of industrial assets and wherein determining whether the output value of the particular asset is similar to the output values of the plurality of industrial assets includes determining an average normal output value from the output values of the plurality of industrial assets.

9. The method of claim 1, wherein determining whether the input value of the particular asset is similar to the input values of the plurality of industrial assets includes excluding the input value of the particular asset from the input values of the plurality of industrial assets and wherein determining whether the output value of the particular asset is similar to the output values of the plurality of industrial assets includes excluding the output value of the particular asset from the output values of the plurality of industrial assets.

10. The method of claim 1, wherein determining whether the input value of the particular asset is similar to the input values of the plurality of industrial assets comprises performing an input similarity test over a specified period of time, and wherein determining whether the output value of the particular asset is similar to the output values of the plurality of industrial assets comprises performing an output similarity test over a specified period of time.

11. The method of claim 1, further comprising performing, for each of the plurality of assets as the particular asset, the steps of (1) determining an error value from a difference between an actual output of the particular asset and a predicted output of the particular asset produced using the process model for the particular asset, (2) based on the error value, determining whether an input value of the particular asset is similar to input values of the plurality of industrial assets and whether an output value of the particular asset is similar to output values of the plurality of industrial assets, and (3) if the input value of the particular asset is similar to the input values of the plurality of industrial assets and the output value of the particular asset is not similar to the output values of the plurality of industrial assets, triggering an alarm indicating an error in the particular asset.

12. The method of claim 1, wherein the input value of the particular industrial asset is a vector and wherein the input values of the plurality of industrial assets are vectors.

13. The method of claim 1, wherein the output value of the particular industrial asset is a vector and wherein the output values of the plurality of industrial assets are vectors.

14. A method for adapting a process model in real time, the method comprising:
obtaining a process model for each of a plurality of industrial assets;
synchronously executing a process using the plurality of industrial assets and the process model for each of the plurality of industrial assets;
for a particular industrial asset, determining an error value from a difference between an actual output of the particular asset and a predicted output of the particular asset produced using the process model for the particular asset;
based on the error value, determining whether an input value of the particular asset is similar to input values of the plurality of industrial assets and whether an output value of the particular asset is similar to output values of the plurality of industrial assets;
wherein if the input value of the particular asset is similar to the input values of the plurality of industrial assets, adapting the process model for the particular asset.

15. The method of claim 14, wherein adapting the process model includes adapting the process model for the particular asset based on the input value of the particular asset and the output value for the particular asset.

16. The method of claim 14, wherein if the input value of the particular asset is similar to the input values of the plurality of industrial assets and the output value of the particular asset is not similar to the output values of the plurality of industrial assets, triggering an alarm indicating an error in the particular asset.

17. The method of claim 14, wherein if the input value of the particular asset is similar to the input values of the plurality of industrial assets and the output value of the particular asset is similar to the output values of the plurality of industrial assets, adapting the process model for the particular asset.

18. The method of claim 14, wherein if the input value of the particular asset is not similar to the input values of the plurality of industrial assets, determining whether a process state defined by the input value of the particular asset was accounted for in development of the process model for the particular asset.

19. The method of claim 18, wherein if the process state defined by the input value of the particular asset was accounted for in the development of the process model, triggering an alarm indicating an error in the particular asset.

20. The method of claim 18, wherein if the process state defined by the input value of the particular asset was not accounted for in the development of the process model, adapting the process model based on the input value of the particular asset.

21. The method of claim 14, wherein determining the error value includes comparing the error value to a threshold value.

22. The method of claim 14, wherein the input values of the plurality of industrial assets comprise calculated average normal input values and the output values of the plurality of industrial assets comprise calculated average normal output values.

23. The method of claim 14, wherein determining whether the input value of the particular asset is similar to the input values of the plurality of industrial assets includes determining an average normal input value from the input values of the plurality of industrial assets and wherein determining whether the output value of the particular asset is similar to the output values of the plurality of industrial assets includes determining an average normal output value from the output values of the plurality of industrial assets.

24. The method of claim 14, wherein determining whether the input value of the particular asset is similar to the input values of the plurality of industrial assets includes excluding the input value of the particular asset from the input values of the plurality of industrial assets and wherein determining whether the output value of the particular asset is similar to the output values of the plurality of industrial assets includes excluding the output value of the particular asset from the output values of the plurality of industrial assets.

25. The method of claim 14, wherein determining whether the input value of the particular asset is similar to the input values of the plurality of industrial assets comprises performing an input similarity test over a specified period of time, and wherein determining whether the output value of the particular asset is similar to the output values of the plurality of industrial assets comprises performing an output similarity test over a specified period of time.

26. The method of claim 14, further comprising performing, for each of the plurality of assets as the particular asset, the steps of (1) determining an error value from a difference between an actual output of the particular asset and a predicted output of the particular asset produced using the process model for the particular asset, (2) based on the error value, determining whether an input value of the particular asset is similar to input values of the plurality of industrial assets and whether an output value of the particular asset is similar to output values of the plurality of industrial assets, and (3) if the input value of the particular asset is similar to the input values of the plurality of industrial assets and the output value of the particular asset is similar to the output values of the plurality of industrial assets, adapting the process model for the particular asset.

27. The method of claim 14, wherein the input value of the particular industrial asset is a vector and wherein the input values of the plurality of industrial assets are vectors.

28. The method of claim 14, wherein the output value of the particular industrial asset is a vector and wherein the output values of the plurality of industrial assets are vectors.

29. An error detection system comprising:
a plurality of industrial assets;
a control unit communicatively connected to the plurality of industrial assets to control operation of the plurality of industrial assets such that the plurality of industrial assets operate in parallel to each other; and
an error detection unit adapted to detect a discrepancy in the operation of a particular industrial asset;
wherein upon detecting the discrepancy in the operation of the particular industrial asset, the error detection unit determines whether an input value of the particular industrial asset is similar to input values of the plurality of industrial assets and whether an output value of the particular industrial asset is similar to output values of the plurality of industrial assets, wherein if the input value of the particular industrial asset is similar to the input values of the plurality of industrial assets and the output value of the particular industrial asset is not similar to the output values of the plurality of industrial assets, the error detection unit generates an alarm indicating an error in the particular industrial asset.

30. The error detection system of claim 29, wherein if the input value of the particular industrial asset is not similar to the input values of the plurality of industrial assets, the error detection unit determines whether the input value of the particular industrial asset was accounted for in development of a process model for the particular industrial asset.

31. The error detection system of claim 30, wherein if the input value of the particular industrial asset was accounted for in the development of the process model for the particular industrial asset, the error detection unit generates an alarm indicating an error in the particular industrial asset.

32. The error detection system of claim 30, wherein if the input value of the particular industrial asset was not accounted for in the development of the process model for the particular industrial asset, the error detection unit adapts the process model based on the input value and the output value of the particular industrial asset.

33. The error detection system of claim 29, wherein if the input value of the particular industrial asset is similar to the input values of the plurality of industrial assets and the output value of the particular industrial asset is similar to the output values of the plurality of industrial assets, the error detection unit adapts a process model for the particular industrial asset based on the input value of the particular industrial asset and the output value of the particular industrial asset.

34. The error detection system of claim 29, wherein the error detection unit comprises a process model generator adapted to generate a process model for one or more the plurality industrial assets and wherein the error detection unit detects the discrepancy in the particular industrial asset by comparing an error value determined by the error detection unit to a threshold value.

35. The error detection system of claim 34, wherein the error detection unit determines the input values of the plurality of industrial assets by calculating an average normal input value from measured input values of the plurality of industrial assets and wherein the error detection unit is adapted to calculate the output values of the plurality of industrial assets by calculating an average normal output value from measured output values of the plurality of industrial assets.

36. The error detection system of claim 34, wherein the error detection unit is adapted to calculate the input values of the plurality of industrial assets by excluding the input value of the particular industrial asset and wherein the error detection unit is adapted to calculate the output values of the plurality of industrial assets by excluding the output value of the particular industrial asset.

37. The error detection system of claim 29, wherein for each of the plurality of industrial assets as the particular industrial asset, the error detection unit performs the steps of (1) determining whether an input value of the particular industrial asset is similar to input values of the plurality of industrial assets and whether an output value of the particular industrial asset is similar to output values of the plurality of industrial assets, and (2) generating an alarm indicating an error in the particular industrial asset if the input value of the particular industrial asset is similar to the input values of the plurality of industrial assets and the output value of the particular industrial asset is not similar to the output values of the plurality of industrial assets.

38. A process model adaptation system comprising:
a plurality of industrial assets;
a control unit communicatively connected to the plurality of industrial assets to control operation of the plurality of industrial assets such that the plurality of industrial assets operate in parallel to each other; and
an error detection unit adapted to detect a discrepancy in a particular industrial asset;
wherein upon detecting the discrepancy in the particular industrial asset, the error detection unit determines whether an input value of the particular industrial asset is similar to input values of the plurality of industrial assets and whether an output value of the particular industrial asset is similar to output values of the plurality of industrial assets, wherein if the input value of the particular industrial asset is similar to the input values of the plurality of industrial assets, the error detection unit adapts a process model for the particular industrial asset.

39. The process model adaptation system of claim 38, wherein the error detection unit adapts the process model for the particular industrial asset based on the input value of the particular industrial asset and the output value of the particular industrial asset.

40. The process model adaptation system of claim 38, wherein if the input value of the particular industrial asset is similar to the input values of the plurality of industrial assets and the output value of the particular industrial asset is not similar to the output values of the plurality of industrial assets, the error detection unit triggers an alarm indicating an error in operation of the particular industrial asset.

41. The process model adaptation system of claim 38, wherein if the input value of the particular asset is similar to the input values of the plurality of industrial assets and the output value of the particular asset is similar to the output values of the plurality of industrial assets, the error detection unit adapts the process model for the particular asset.

42. The process model adaptation system of claim 38, wherein if the input value of the particular industrial asset is not similar to the input values of the plurality of industrial assets, the error detection unit determines whether the input value of the particular industrial asset was accounted for in development of the process model for the particular industrial asset.

43. The process model adaptation system of claim 42, wherein if the input value of the particular industrial asset was accounted for in the development of the process model for the particular industrial asset, the error detection unit triggers an alarm indicating an error in the particular industrial asset.

44. The process model adaptation system of claim 42, wherein if the input value of the particular industrial asset was not accounted for in the development of the process model for the particular industrial asset, the error detection unit adapts the process model based on the input value of the particular industrial asset.

45. The process model adaptation system of claim 38, wherein the control unit comprises a process controller adapted to generate one or more control signals for executing a process which controls each of the plurality of industrial assets, and wherein the error detection unit executes the process model for each of the plurality of industrial assets synchronously with the control unit controlling the process, includes a process model generator adapted to generate the process model for one or more of the plurality of industrial assets, and detects the discrepancy in the particular industrial asset by comparing an error value to a threshold value.

46. The process model adaptation system of claim 45, wherein the error detection unit calculates the input values of the plurality of industrial assets by calculating an average normal input value from measured input values of the plurality of industrial assets and wherein the error detection unit is adapted to calculate the output values of the plurality of industrial assets by calculating an average normal output value from measured output values of the plurality of industrial assets.

47. The process model adaptation system of claim 45, wherein the error detection unit calculates the input values of the plurality of industrial assets by excluding the input value of the particular industrial asset and wherein the error detection unit is adapted to calculate the output values of the plurality of industrial assets by excluding the output value of the particular industrial asset.

48. The process model adaptation of claim 38, wherein for each of the plurality of industrial assets as the particular industrial asset, the error detection unit performs the steps of (1) determining whether an input value of the particular industrial asset is similar to input values of the plurality of industrial assets and whether an output value of the particular industrial asset is similar to output values of the plurality of industrial assets, and (2) adapting a process model for the particular industrial asset if the input value of the particular industrial asset is similar to the input values of the plurality of industrial assets and the output value of the particular industrial asset is similar to the output values of the plurality of industrial assets.

* * * * *